United States Patent Office 3,003,009
Patented Oct. 3, 1961

3,003,009
ODORLESS ISOPARAFFINIC SOLVENT
MANUFACTURE
George W. Gurd, Sarnia, Ontario, Canada, and Curvin H. Stein, deceased, late of Sarnia, Ontario, Canada, by Dorothea A. Stein, legal representative, Sarnia, Ontario, Canada, assignors to Esso Research and Engineering Company, a corporation of Delaware
No Drawing. Filed Oct. 14, 1959, Ser. No. 846,244
5 Claims. (Cl. 260—683.9)

This invention relates to a method for manufacture of a substantially odorless isoparaffinic (branched-chain) solvent from polyolefins characterized by polypropylene trimers and tetramers using a nickel hydrogenation catalyst and treating conditions that make the solvent of substantially uniform high quality.

Prior to the present invention, odorless isoparaffinic solvents were made practically exclusively by treatment applied to alkylates of butylene reacted with isobutane. Although these solvents made in this manner have better odor qualities than the solvents known as deodorized or low odor solvents, which are composed mainly of naphthenes and paraffins with minor amounts of aromatics, they have had certain drawbacks in evaporation rates and solvency. They have not had uniform odor quality and there have been problems of availability.

In accordance with the present invention, odorless isoparaffinic solvents are prepared from branched-chain mono-olefins, particularly polypropylene trimers and tetramers in a manner to yield a solvent having better evaporation, solvency, and odor qualities than have been characteristic of the isoparaffin alkylates.

Exploratory work showed that the problem of treating the iso-mono-olefins (branched-chain mono-olefins) to obtain a competitively high quality odorless solvent was not simple and straightforward. It was found that the nature of the olefins subjected to hydrogenation is a factor, also, the conditions of hydrogenation of the available olefinic starting material, preferably obtained from polypropylene trimer and tetramer fractions, such as made by polymerizing propylene with a phosphoric acid catalyst to produce the alkylating agent reacted with benzene in the manufacture of detergent alkylate intermediate. The iso-olefins contain an average of between 4 and 6 methyl groups. They will ordinarily contain a small amount of sulfur compounds and cyclic olefins, or such contaminants difficult to hydrogenate and which form compounds that tend to be deleterious in the product with respect to odor and color. Thus formed impurities and impurities that arise from insufficient hydrogenation, cracking, polymerization, dehydrogenation and oxidation are not all separable economically. even with a nickel hydrogenation catalyst used in hydrogenating the iso-olefins it was found that cracking and polymerization would occur, thus giving a lower yield, a degraded solvent product, and shortened catalyst life.

More recent experimental studies show that the problems of preparing improved isoparaffin odorless solvents are solved by taking certain steps which will be described in more detail.

First, the polypropylene or iso-olefin feed for the hydrogenation should be of good quality and of proper boiling range. It should be made by polymerizing propylene of adequately high purity, i.e., with minimum amounts of n-butylene and isobutylene and preferably contain not more than about 10 p.p.m. sulfur. Above 10 p.p.m. sulfur in the feed causes too rapid poisoning of the nickel hydrogenation catalyst.

The polypropylenes are carefully fractionated to have a suitable boiling range and this helps to eliminate undesirable components. Inspection of satisfactory feed stocks show the following characteristics:

TABLE I

*Inspections of acceptable polypropylene feed stocks*

| | |
|---|---|
| Gravity | 50 to 55 |
| Flash (tag), °F | 89 to 130 |
| Refractive index | 1.433 to 1.436 |
| Bromine No. (Lewis and Bradstreet method) | 81 to 100 |
| Color, Saybolt | +15 to +26 |
| Aniline point, °F. (ASTM D611–55T) | 140 to 150 |
| ASTM distillation: | |
| IBP, °F | 300 to 370 |
| 50% | 320 to 380 |
| FBP, °F | 370 to 460 |
| Sulfur, p.p.m | 0 to 10 |

The foregoing inspection ranges are given as a general guide as to approximate limits for the polypropylene feeds. The preferred feeds have inspection values within these limits, e.g., a heart cut made up of heavy trimer and light tetramer and boiling within the range of 330° F. to 390° F. with a mid-boiling point at 360±5° F.

Some variations are permissible in the boiling range of the polypropylene feed, insofar as fractionation of the product can correct for the volatility characteristics; however, it is advantageous to avoid having substantial amounts of feed components subjected to the hydrogenation which are not to be converted to isoparaffinic solvent components of the final product.

In the hydrogenation the nickel catalyst may be selected from known commercially available types, Ni or NiO, or hydrate on a porous support, such as kieselguhr, alumina or pumice. The nickel oxide or hydrate may be reduced with hydrogen in the reaction vessel. Some of the work was done with a Harshaw catalyst 0101–T (43% Ni) and some with U.O.P. nickel catalyst.

Hydrogenation studies were carried out with varied temperatures, 350–600° F., pressures from 400–800 p.s.i.g., and space velocities of the feed, e.g., 1–10 v./v./hr. (liquid volume of feed/volume of catalyst/hr.). Hydrogen both pure and in off-gas from a reforming unit (79% $H_2$) was used at rates of 500–3000 s.c.f./bbl. of feed.

It was found important to obtain nearly complete saturation of the olefins in the feed (98–99%) with less than 10 or 15% loss by side reactions (cracking and polymerization).

The nickel catalyst hydrogenation temperatures found essential for making an acceptable product are from about 300–600° F., preferably 400–600° F. At below 300° F. hydrogenation is generally incomplete (>4% olefins remaining). At above 600° F. cracking and polymerization is excessive. As the temperature is increased the pressure may be increased, e.g., to about 800 p.s.i.g. and the space velocity increased, e.g., to about 5 to 10 v./v./hr.

Tests were made batchwise and in a continuous pilot plant unit.

*Example*

The continuous reactor was a stainless steel tube, fitted for downflow of feed from a preheater. Plant (hydroformer) hydrogen gas was scrubbed with lye (20° Bé.), dried and mixed with the feed. Temperature controls were attached. The catalyst as ⅛ inch pellets crushed to 10–20 mesh size was fixed in the reactor. Effluent from the reactor was cooled, condensed liquid product was separated from gas and passed to a stripper heated at the bottom. The stripper could be operated under vacuum or could be fed with inert gas ($N_2$) or hydrogen.

With the continuous reactor the catalyst life was determined in terms of hours of operation in making an acceptable product.

To investigate the effects of boiling range of the polypropylene feed, three different fractions were used as feeds.

TABLE II

| Feed | 1 | 2 | 3 |
|---|---|---|---|
|  | Front End of Tetramer | Trimer Bottoms | Heart Cut of Trimer Bottoms |
| ASTM Boiling Range, °F | 334–390 | 336–453 | 344–384 |
| RI at 20° C | 1.4334 | 1.4361 | 1.4347 |

Feeds 2 and 3 were separately hydrogenated in the continuous unit at 400° F., 800 p.s.i.g., at 10 v./v./hr., with 2000 s.c.f. $H_2$/bbl. using a nickel catalyst. The reaction was controlled by refractive index (RI) measurements to which bromine number is correlated. Bromine numbers were mostly determined by the Lewis and Bradstreet method. In the low range 0–20, ASTM method D1159–55T gave essentially the same results.

It was found that the narrow cut feed 3 gave higher more consistent conversion of olefins than the wider cut feed. After 300 hours' catalyst life, feed 3 gave 99% olefin conversion, indicated by an RI at 20° C. of the product of 1.4230 to 1.4232 and a bromine number of 1. Feed 2 gave a conversion fluctuating mostly in the range from 95–100%, the RI of the product varying mainly from 1.4220 to 1.4231.

In general, the hydrogenation changes the RI from the feed stock range of 1.433 to 1.436 to the product range of 1.422 to 1.423.

Feed 1, a narrow cut, was treated batchwise at 400° F., 800 p.s.i.g., and 2 v./v./hr. equivalent space velocity and the resulting product was found to be of high quality particularly in its low bromine number of 0.4, good evaporation rate of 86 minutes for 95% evaporation at 72° F.

The olefin conversion (saturation to paraffins) is approximately equal to 100 minus the bromine number provided there is negligible cracking or other degradation. Thus, the bromine number of the product should be less than about 2 for 98% conversion which is highly desirable.

Odor quality of the isoparaffin products made in the continuous unit were generally good and best at olefin conversion levels of 97–100%.

Using reaction temperatures and pressures that were varied, the nickel catalysts were tested on a 362–428° F. polypropylene feed, e.g., 400° F., 400 p.s.i.g.; 500° F., 800 p.s.i.g.; 600° F., 800 p.s.i.g. The products obtained had good odor qualities and bromine numbers of 1–2.

Some correction can be made in odor by treatment with absorbents, but the improvement is not always adequate. Some correction can also be made in the evaporation rate by distillation, e.g., under vacuum with inert gas, but redistillation causes loss in product removed as front ends and heavy ends.

The olefin polymer feed may be given a preliminary hydrogenation for partial conversion of the olefins using a nickel catalyst or other catalyst, e.g., cobalt molybdate under mild conditions.

In addition to the requirements that the solvent be odorless and have a suitable evaporation rate to qualify as an odorless solvent, an important evaluation is the solvency of the solvent which principally depends upon the ability of the solvent to dissolve a certain amount of alkyd resin without becoming too thick or viscous.

The so-called conventional solvents which are not odorless contain paraffins, naphthenes, and some aromatics. They have a high solvency from the viewpoint that they have kauri-butanol values of 38–40 (ASTM D1133–54T) and aniline points of 120–130 (ASTM D611–55T).

Hydrogenated polypropylenes made in accordance with the present invention have kauri-butanol values of 27 to 28.5 and aniline points of 178–182. Since these solvency attributes are only slightly better than those of the commercial odorless solvents from isobutane-butylene alkylate (which generally have a kauri-butanol value closer to 26.5 and an aniline point of 185 to 191) one might expect only a slight solvency advantage in these respects for the solvency of the hydrogenated polypropylene solvent. However, experiments using alkyd resins and viscosity measurements demonstrated a much higher solvent power for the hydrogenated polypropylene solvent.

The ability of a solvent to reduce the viscosity of resins at high content in solution is important in paint formulation. The resin content should be as high as possible for a given viscosity. This is particularly important in gloss paints in which there should be sufficient resin to give high initial gloss and good gloss retention.

The viscosities can be determined by the Gardner Holdt bubble viscosimeter. The viscosities were measured at each dilution stage (20, 30, 40, 50, and 60% solids). Kinematic viscosities were also determined reproducibly by ASTM method D445–53T at these stages.

Data illustrating that the hydrogenated polypropylenes give lower viscosity solutions at the same resin content is given in the following table.

TABLE III

[Resin: Glyptal odorless long soya alkyd resin]

|  | Solvent | | Relative Viscosity (2)/(1) |
|---|---|---|---|
|  | Alkylate (1) | Hydrogenated Polypropylene (2) |  |
| Viscosities at 77° F.: |  |  |  |
| 60% Resin Solids— |  |  |  |
| N.V.M.,[1] Wt. Percent | 59.2 | 60.2 |  |
| Gardner Holdt | $Z_5$– | $Z_4$– |  |
| Kinematic Visc., cs | 12,304 | 7,886 | 64% |
| Saybolt Universal Visc., secs | 57,000 | 36,000 |  |
| 30% Resin Solids— |  |  |  |
| N.V.M.,[1] Wt. Percent | 30.0 | 29.5 |  |
| Kinematic Visc., cs | 32.5 | 20.9 | 64% |
| Saybolt Universal Visc., secs | 152 | 102 |  |

[1] Nonvolatile matter.

The foregoing comparative data is typical for all levels of solids content and for various commercial alkylate solvents compared to other hydrogenated polypropylene samples. Directionally, agreement was obtained between the different methods of viscosity measurement, showing that the hydrogenated polypropylene solvents generally are much better for obtaining a much lower viscosity solution at a given resin content.

To determine the cause of the solvency advantage for the hydrogenated polypropylene investigations were made with infra-red analysis. Both alkylate and hydrogenated polypropylene solvents, of suitable volatility, were observed to have not more than 8 of the 11 (average) carbon atoms in a straight chain. The average number of methyl groups per molecule for the alkylate was 4.0 and for the hydrogenated polymer 4.6. This would indicate more branchiness for the heavy alkylate, particularly at one part, e.g., near the center, as in 4-propyl octane (3 methyl groups) or 3,4-diethyl 4-propyl heptane (4 methyl groups). On the other hand, hydrogenated polypropylene has branching at the ends of the chain due to the high proportions of tri- and tetramethyl substituted olefins, known as type IV and type V olefins, they contain. These result in isoparaffins of the type represented by 3,5,6 trimethyl octane (5 methyl groups) and 2,3,4,6 tetramethyl heptane (6 methyl groups). However, this explanation is not intended to be limiting since the factors of determining possible geometric isomers and the effects on solvency are complicated.

The process described is claimed as follows:

1. A process of manufacturing odorless isoparaffinic solvents which comprises polymerizing propylene containing minimum amounts of n-butylene and isobutylene and containing not more than 10 p.p.m. sulfur with a phosphoric acid catalyst, recovering from the polymer product by fractionation a polypropylene feed stock having a boiling range of between 300 and 460° F., a gravity of 50 to 55, a refractive index at 20° C. of 1.433 to 1.436, a bromine number of from 81 to 100 and an aniline point of 140° F. to 150° F. and reacting said polypropylene feed stock with hydrogen at about 300 to 600° F. and 200–800 p.s.i.g. in contact with a nickel catalyst thereby effecting at least 98% saturation of the polypropylenes in the feed stock with less than 10 to 15% loss by side reactions such as cracking and polymerization.

2. A process of manufacturing odorless isoparaffinic solvents which comprises polymerizing propylene containing minimum amounts of n-butylene and isobutylene and containing not more than 10 p.p.m. sulfur with a phosphoric acid catalyst, recovering from the polymer product by fractionation a polypropylene feed stock having a boiling range of between 330 and 390° F., a gravity of 50 to 55, a refractive index at 20° C. of 1.433 to 1.436, a bromine number of from 81 to 100 and an aniline point of 140° F. to 150° F. and reacting said polypropylene feed stock with hydrogen at about 300 to 600° F. and 200–800 p.s.i.g. in contact with a nickel catalyst thereby effecting at least 98% saturation of the polypropylenes in the feed stock with less than 10 to 15% loss by side reactions such as cracking and polymerization and thereby obtaining an isoparaffinic product having a refractive index at 20° C. in the range of from about 1.422 to 1.423.

3. The process as defined in claim 1 wherein the hydrogenated product is fractionated to obtain an intermediate fraction boiling in the range of 330–390° F.

4. An odorless isoparaffinic solvent consisting essentially of hydrogenated trimers and tetramers of propylene boiling in the range of 300° to 460° F., said solvent being further characterized by an aniline point in the range of 178 to 182, a kauri-butanol value in the range of 27 to 28.5, and a refractive index at 20° C. in the range of 1.422 to 1.423 produced by the process of claim 1.

5. An odorless isoparaffinic solvent consisting essentially of hydrogenated polypropylenes that boil in the range of 330° to 390° F. and characterized by an aniline point in the range of 178 to 182, a kauri-butanol value in the range of 27 to 28.5 and a bromine number less than 2 maximum produced by the process of claim 2.

References Cited in the file of this patent

UNITED STATES PATENTS

| | | |
|---|---|---|
| 2,216,372 | Lyman et al. | Oct. 1, 1940 |
| 2,342,074 | Deanesly et al. | Feb. 15, 1944 |
| 2,762,853 | Jones et al. | Sept. 11, 1956 |